United States Patent
Tai et al.

(10) Patent No.: US 8,760,580 B2
(45) Date of Patent: Jun. 24, 2014

(54) IMAGE SHARPNESS DEVICE AND METHOD FOR THE SAME

(75) Inventors: Albert Hua Tai, Hsinchu (TW); Heng-Yi Liu, Hsinchu (TW); Feng-Chi Wei, Hsinchu (TW)

(73) Assignee: Silicon Integrated Systems Corp., Hsinchu (TW)

( * ) Notice: Subject to any disclaimer, the term of this patent is extended or adjusted under 35 U.S.C. 154(b) by 80 days.

(21) Appl. No.: 13/527,582

(22) Filed: Jun. 19, 2012

(65) Prior Publication Data
US 2013/0335633 A1 Dec. 19, 2013

(51) Int. Cl.
*H04N 5/14* (2006.01)
*H04N 5/00* (2011.01)

(52) U.S. Cl.
USPC .................. 348/607; 348/606; 348/571

(58) Field of Classification Search
USPC .................................. 348/606–607
See application file for complete search history.

(56) References Cited

U.S. PATENT DOCUMENTS

| 3,947,631 | A | * | 3/1976 | Rhee et al. | 348/607 |
| 4,991,021 | A | * | 2/1991 | Nikoh et al. | 348/606 |
| 8,031,967 | B2 | * | 10/2011 | Zhang et al. | 382/275 |
| 2011/0279730 | A1 | * | 11/2011 | Goshi | 348/627 |

* cited by examiner

*Primary Examiner* — Jefferey Harold
*Assistant Examiner* — Michael Teitelbaum

(57) ABSTRACT

An image sharpness device and a method for the same are disclosed. The image sharpness device includes a DC removal unit, at least one filter, at least one noise estimation unit, at least one soft threshold processing unit, and a summing unit. The DC removal unit receives a luminance signal of a field of a frame and removes a DC component of the luminance signal. The filter passes a component of an output of the DC removal unit within a predetermined frequency band. The noise estimation unit estimates a noise value of the field. The soft threshold processing unit forms a sharpness signal according to the noise value. The summing unit sums the luminance signal and the sharpness signal to output a resultant luminance signal. The present invention is capable of avoiding the problem that a noise in the luminance signal is enhanced.

11 Claims, 12 Drawing Sheets

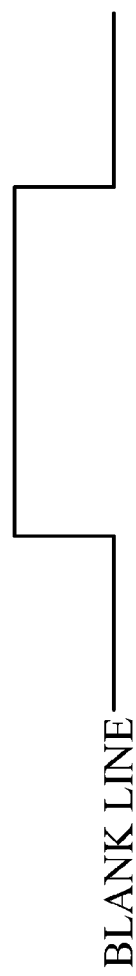
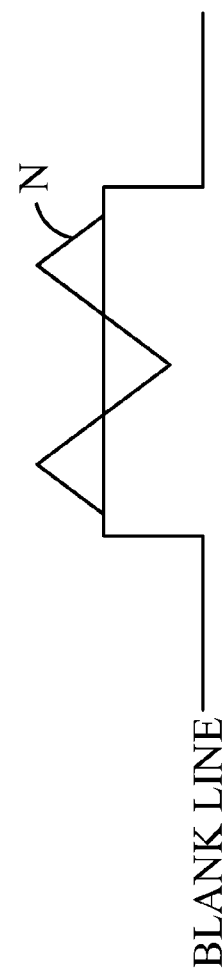

IMAGE SHARPNESS DEVICE AND METHOD FOR THE SAME

TECHNICAL FIELD OF THE INVENTION

The present invention relates to a device, more particularly, to an image sharpness device and a method for the same.

BACKGROUND OF THE INVENTION

In an analog television, a composite video signal of an image comprises a luminance signal (Y) and a chrominance signal (C). A comb filter is commonly used to separate the luminance signal and the chrominance signal from the composite video signal. The process of separating the luminance signal and the chrominance signal is referred to as a Y/C separation.

An image sharpness processing for the luminance signal is capable of enhancing edges of an image, that is, the image can become clearer. Generally speaking, the image sharpness processing is to add a sharpness signal to the luminance signal. The sharpness signal is obtained according to the luminance signal. However, when the edges of the image are enhanced, a noise is also enhanced and quality of the image is affected.

Therefore, there is a need for a solution to avoid the problem that when the edges of the image are enhanced, the noise is also enhanced.

SUMMARY OF THE INVENTION

An objective of the present invention is to provide an image sharpness device and a method for the same.

In accordance with an aspect of the present invention, an image sharpness device comprises a DC removal unit, at least one filter, at least one noise estimation unit, at least one soft threshold processing unit, and a summing unit. A composite video signal in a field of a frame has a luminance signal. The DC removal unit receives the luminance signal and removes a DC component of the luminance signal. The filter passes a component of an output of the DC removal unit within a predetermined frequency band while filters out the other components of the output of the DC removal unit. The noise estimation unit estimates a noise value of the field of the frame. The soft threshold processing unit forms a sharpness signal by subtracting the noise value from a positive component of the output of the filter and adding the noise value to a negative component of the output of the filter when an absolute value of an output of the filter is greater than the noise value, or the soft threshold processing unit forms the sharpness signal by setting the output of the filter to be zero when the absolute value of the output of the filter is smaller than the noise value. The summing unit sums the luminance signal and the sharpness signal to output a resultant luminance signal.

In accordance with another aspect of the present invention, a composite video signal in a field of a frame has a luminance signal in an image sharpness method. The image sharpness method comprises the following steps: receiving the luminance signal; removing a DC component of the luminance signal; passing a component of the luminance signal within a predetermined frequency band while filtering out the other components of the luminance signal; estimating a noise value of the field of the frame; forming a sharpness signal by subtracting the noise value from a positive component of the luminance signal within the predetermined frequency band and adding the noise value to a negative component of the luminance signal within the predetermined frequency band when an absolute value of the luminance signal within the predetermined frequency band is greater than the noise value; forming the sharpness signal by setting the luminance signal within the predetermined frequency band to be zero when the absolute value of the luminance signal within the predetermined frequency band is smaller than the noise value; and summing the luminance signal and the sharpness signal to output a resultant luminance signal.

The image sharpness device and the method for the same according to the present invention are capable of avoiding the problem that a noise in the luminance signal is enhanced by adaptively estimating the noise at the time of enhancing the luminance signal.

BRIEF DESCRIPTION OF THE DRAWINGS

The present invention will be described in detail in conjunction with the appending drawings, in which:

FIG. 3A is a schematic diagram showing a blank line without a noise;

FIG. 3B is a schematic diagram showing a blank line with a noise;

DETAILED DESCRIPTION OF THE INVENTION

Figure 1:
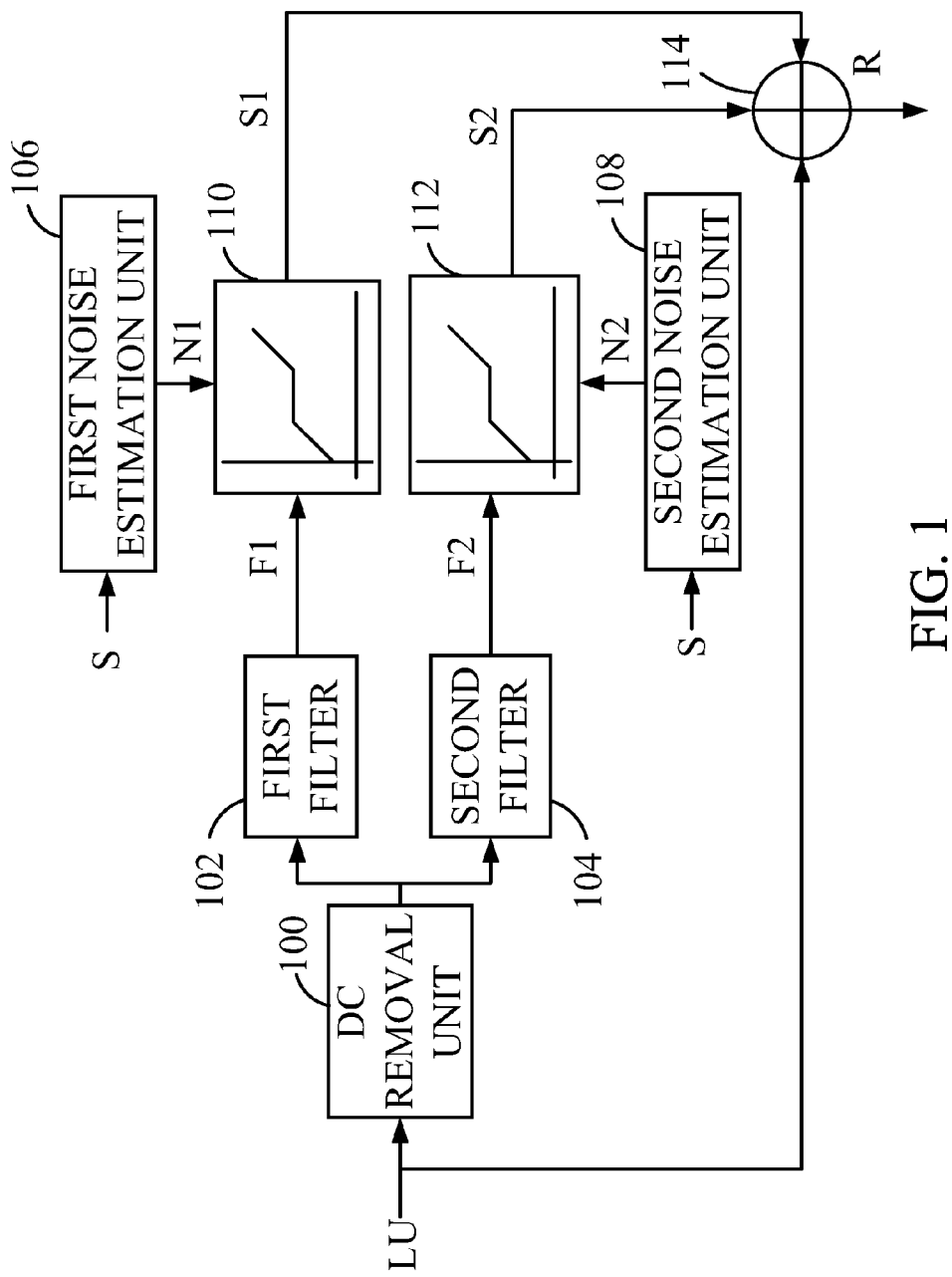
FIG. 1 is a schematic diagram showing an image sharpness device according to a first embodiment of the present invention.

FIG. 1 is a schematic diagram showing an image sharpness device according to a first embodiment of the present invention. The image sharpness device comprises a DC removal unit 100, a first filter 102, a second filter 104, a first noise estimation unit 106, a second noise estimation unit 108, a first soft threshold processing unit 110, a second soft threshold processing unit 112, and a summing unit 114.

The DC removal unit 100 receives a luminance signal LU and removes a DC (direct current) component of the luminance signal LU. A composite video signal in a field of a frame has the luminance signal LU and a chrominance signal (not shown). The luminance signal LU may be a 3D luminance signal generated by a 3D comb filter or a non-3D luminance signal generated by a non-3D comb filter. The 3D and non-3D comb filters are understood by one skilled in the art and omitted herein. The DC removal unit 100 may be a band pass filter or a high pass filter.

The first filter 102 passes a component of an output of the DC removal unit 100 within a first frequency band and filters out the other components of the output of the DC removal unit 100. The second filter 104 passes a component of the output of the DC removal unit 100 within a second frequency band and filters out the other components of the output of the DC removal unit 100. In the present embodiment, the first filter 102 is a low pass filter for passing a low frequency component of the output of the DC removal unit 100, while the second filter 104 is a high pass filter for passing a high frequency component of the output of the DC removal unit 100. For the convenience of description, an output of the first filter 102 is denoted as a first filtered signal F1, and an output of the second filter 104 is denoted as a second filtered signal F2. In the prior art, the first filtered signal F1 is directly added to the luminance signal LU for enhancing a low frequency component of the luminance signal LU, and the second filtered signal F2 is directly added to the luminance signal LU for enhancing a high frequency component of the luminance signal LU. However, since the first and second filtered signals F1, F2 comprise noises, the noises in the first and second filtered signals F1, F2 are also added to the luminance signal LU. That is, after the first and second filtered signals F1, F2 are directly added to the luminance signal LU, the luminance signal LU and the noises are enhanced at the same time. The present invention discloses a noise estimation mechanism to avoid the problem that the noises are enhanced.

The first noise estimation unit 106 estimates and outputs a first noise value N1 of the field of the frame. The second noise estimation unit 108 estimates and outputs a second noise value N2 of the field of the frame. More particularly, the first noise value N1 is a noise of a low frequency component of a signal S, while the second noise value N2 is a noise of a high frequency component of the signal S. The signal S and the luminance signal LU are in the same field of the frame. The signal S will be described in detail later.

The first soft threshold processing unit 110 is electrically coupled to the first filter 102 and the first noise estimation unit 106 for performing a soft threshold operation on the first filtered signal F1 according to the first noise value N1 and outputting a first sharpness signal S1. The soft threshold operation means that when an absolute value of the first filtered signal F1 is greater than the first noise value N1, the first sharpness signal S1 is formed by subtracting the first noise signal N1 from a positive component of the first filtered signal F1 and adding the first noise value N1 to a negative component of the first filtered signal F1; when the absolute value of the first filtered signal F1 is smaller than the first noise value N1, the first sharpness signal S1 is formed by setting the first filtered signal F1 to be zero. The first sharpness signal S1 is utilized for enhancing the component of the luminance signal LU within the first frequency band.

Specifically, when the first filtered signal F1 is greater than the first noise value N1, the first soft threshold processing unit 110 decreases the enhancement of the first noise value N1 by subtracting the first noise signal N1 from the positive component of the first filtered signal F1 and adding the first noise value N1 to the negative component of the first filtered signal F1. When the first filtered signal F1 is smaller than the first noise value N1, the first soft threshold processing unit 110 decreases the enhancement of the first noise value N1 by setting the first filtered signal F1 to be zero, that is, the first sharpness signal S1 is zero.

In the same manner, the second soft threshold processing unit 112 is electrically coupled to the second filter 104 and the second noise estimation unit 108 for performing a soft threshold operation on the second filtered signal F2 according to the second noise value N2 and outputting a second sharpness signal S2. When an absolute value of the second filtered signal F2 is greater than the second noise value N2, the second sharpness signal S2 is formed by subtracting the second noise value N2 from a positive component of the second filtered signal F2 and adding the second noise value N2 to a negative component of the second filtered signal F2; when the absolute value of the second filtered signal F2 is smaller than the second noise value N2, the second sharpness signal S2 is formed by setting the second filtered signal F2 to be zero. The second sharpness signal S2 is utilized for enhancing the component of the luminance signal LU within the second frequency band.

Specifically, when the second filtered signal F2 is greater than the second noise value N2, the second soft threshold processing unit 112 decreases the enhancement of the second noise value N2 by subtracting the second noise signal N2 from the positive component of the second filtered signal F2 and adding the second noise value N2 to the negative component of the second filtered signal F2. When the second filtered signal F2 is smaller than the second noise value N2, the second soft threshold processing unit 112 decreases the enhancement of the second noise value N2 by setting the second filtered signal F2 to be zero, that is, the second sharpness signal S2 is zero.

In conclusion, the first soft threshold processing units 110 and the second soft threshold processing unit 112 are utilized for respectively reducing the first noise value N1 and the second noise value N2 by forcing them to zero, and this means that the enhancement of the first noise value N1 and the enhancement of the second noise value N2 can be decreased.

The summing unit 114 sums the luminance signal LU, the first sharpness signal S1, and the second sharpness signal S2 to generate and output a resultant luminance signal R. When the first sharpness signal S1 is not zero and the second sharpness signal S2 is not zero, this means that the first filtered signal F1 is greater than the first noise value N1 and the second filtered signal F2 is greater than the second noise value N2. Accordingly, the first and second sharpness signals S1, S2 are used for enhancing the components of the luminance signal LU within the first and second frequency bands, but the noise in the luminance signal LU is not enhanced.

When one of the first and second sharpness signals S1, S2 is not zero, this means that only one of the first and second filtered signals F1, F2 is greater than its corresponding noise value. Accordingly, only one of the first and second sharpness signals S1, S2 is used for enhancing the component of the luminance signal LU within the corresponding frequency band, and the other one of the first and second sharpness signals F1, F2 is not used for enhancing the component of the luminance LU within the corresponding frequency band.

When both of the first and second sharpness signals S1, S2 are zero, this means that the first and second filtered signals F1, F2 are respectively smaller than the first and second noise values N1, N2. Accordingly, the first and second sharpness signals S1, S2 are not proper to be used for enhancing the components of the luminance signal LU within the first and second frequency bands because the first and second filtered signals F1, F2 are respectively smaller than the first and second noise values N1, N2. The luminance signal LU is directly served as the resultant luminance signal R. More particularly, the resultant luminance signal R is not enhanced, and the noises are not enhanced, either. That is, the luminance signal LU is not worsened.

Figure 2:
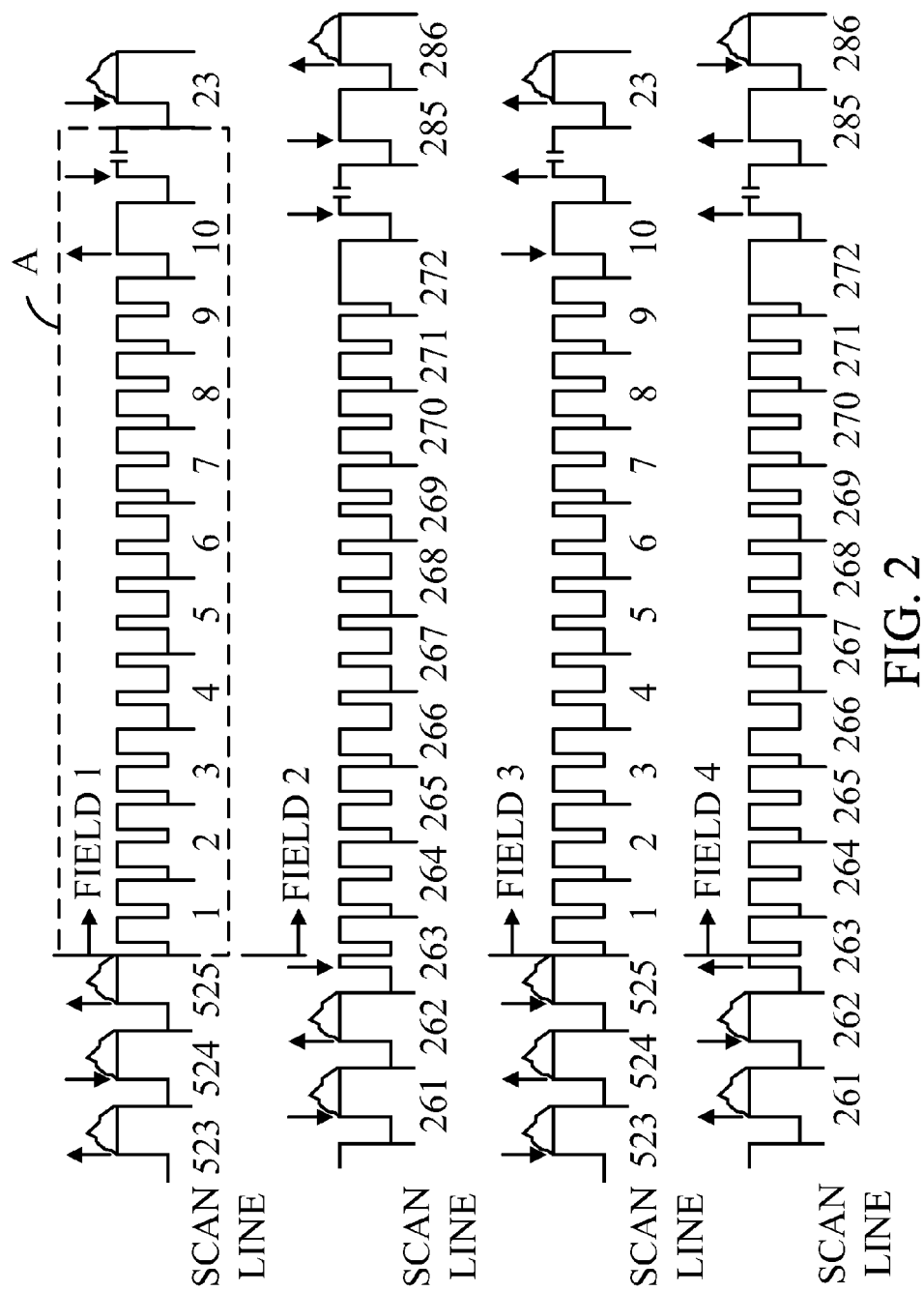
FIG. 2 is a schematic diagram showing a vertical blank timing of National Television System Committee standard.

Please refer to FIG. 2. FIG. 2 is a schematic diagram showing a vertical blank timing of National Television System Committee (NTSC) standard. According to NTSC standard, the frame is composed of two fields, and the two fields consist of 262 and 263 scan lines, respectively. Furthermore, NTSC standard defines some scan lines which do not contain data (the data comprises the luminance signal LU in FIG. 1). For example, some scan lines in a blank line area A do not contain data. The scan lines which do not contain data contain vertical-sync, equalizing pulses and so on. For the convenience of description, the scan lines which do not contain data are referred to as blank lines. It is noted that vertical blanking interval (VBI) signals might appear in some scan lines in the blank line area A, and the VBI signals in some scan lines could not be used in the present invention.

Please refer to FIG. 3A and FIG. 3B. FIG. 3A is a schematic diagram showing a blank line without a noise (i.e. an ideal condition of a blank line), while FIG. 3B is a schematic diagram showing a blank line with a noise N. When the blank line does not contain a noise, the blank line should be flat as shown in FIG. 3A. In contrast, when the blank line contains the noise N, the blank line is not flat as shown in FIG. 3B, that is, any signals may be found in the blank line. The present invention estimates the first and second noise values N1, N2 in FIG. 1 by observing whether the blank line is flat or not.

Figure 4:
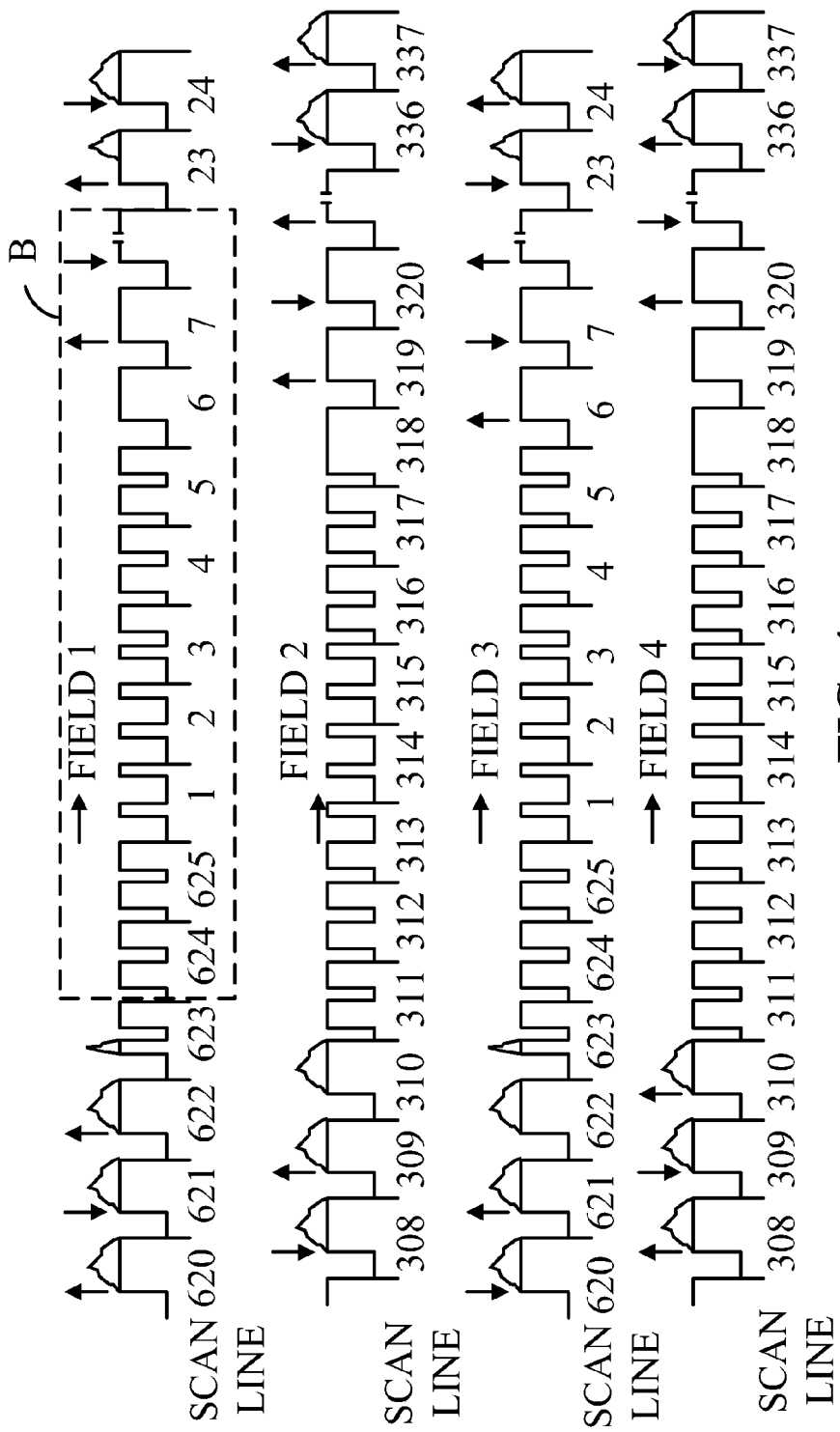
FIG. 4 is a schematic diagram showing a vertical blank timing of Phase Alternation by Line standard.

Please refer to FIG. 4. FIG. 4 is a schematic diagram showing a vertical blank timing of Phase Alternation by Line (PAL) standard. The same as NTSC standard, some scan lines in a blank line area B of PAL standard do not contain data. Accordingly, the present invention can estimate the first and second noise values N1, N2 in FIG. 1 by observing whether at least one of the blank lines of PAL standard is flat or not.

Figure 5:
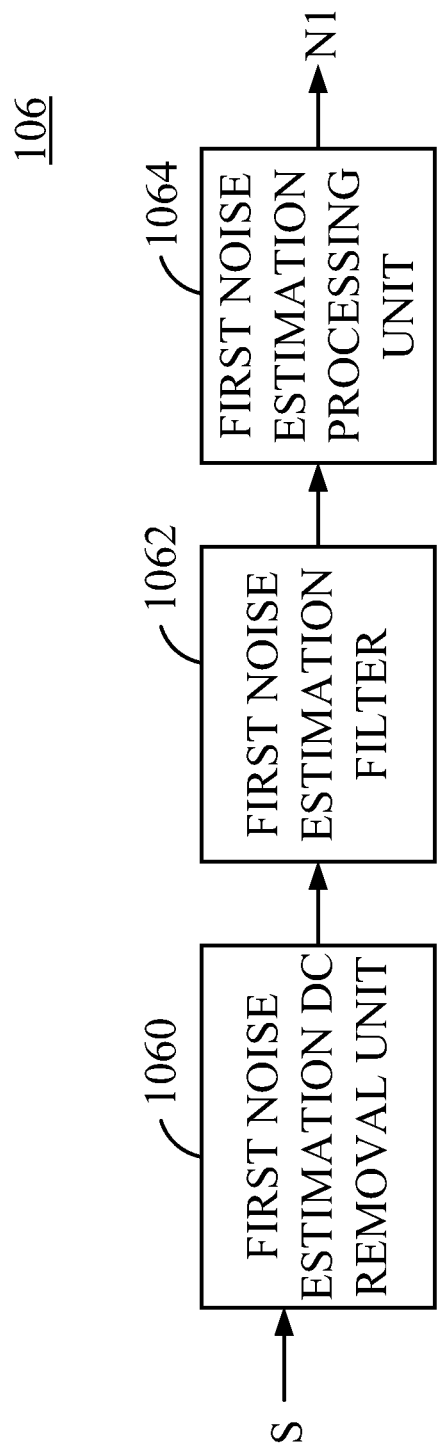
FIG. 5 is a schematic diagram showing a block diagram of the first noise estimation unit in FIG. 1.

Please refer to FIG. 1 and FIG. 5. FIG. 5 is a schematic diagram showing a block diagram of the first noise estimation unit 106 in FIG. 1. The first noise estimation unit 106 comprises a first noise estimation DC removal unit 1060, a first noise estimation filter 1062, and a first noise estimation processing unit 1064.

The first noise estimation DC removal unit 1060 receives the signal S in at least one blank line of the field. As mentioned above, the blank line is a scan line without the luminance signal LU. Specifically, the signal S is in the blank line area A in FIG. 2 or in the blank line area B in FIG. 4. The first noise estimation DC removal unit 1060 removes a DC component of the signal S.

The first noise estimation filter 1062 is electrically coupled to the first noise estimation DC removal unit 1060. The first noise estimation filter 1062 passes a component of an output of the first noise estimation DC removal unit 1060 within the first frequency band and filters out the other components of the output of the first noise estimation DC removal unit 1060.

The first noise estimation processing unit 1064 is electrically coupled to the first noise estimation filter 1062. The first noise estimation processing unit 1064 estimates a noise of an output of the noise estimation filter 1062 to generate and output the first noise value N1, i.e. estimates a noise of the blank line. For instance, the first noise estimation processing unit 1064 generates a plurality of absolute values of the output of the first noise estimation filter 1062, finds out a maximum value in an N-point cycle of the field, and accumulates a plurality of maximum values in a plurality of N-point cycles of the field. N is a positive integer. A sampling frequency of the luminance signal LU is commonly set as N×Fsc, and N-point is depending on the sampling frequency of N×Fsc. Fsc is a carrier frequency of the luminance signal LU. A purpose of finding out the maximum value in the N-point cycle of the field is to avoid the absolute values to be small. When the absolute values are too small, the estimated first noise value N1 is not accurate. In one embodiment, an infinite impulse response filter may be used for accumulating the maximum values of the field.

The second noise estimation unit 108 in FIG. 1 has the same elements as those of the first noise estimation unit 106 in FIG. 5 and thus is not repeated herein. A difference between the first noise estimation unit 106 and the second noise estimation unit 108 is that the first noise estimation unit 106 processes the first frequency band component of the signal S while the second noise estimation unit 108 processes the second frequency band component of the signal S. The first noise estimation filter 1062 in FIG. 5 is corresponding to the first filter 102 in FIG. 1, that is, the first noise estimation filter 1062 in FIG. 5 and the first filter 102 in FIG. 1 are operated in the same frequency band (i.e. the first frequency band). In the same manner, the second noise estimation filter (not shown) of the second noise estimation unit 108 and the second filter 104 in FIG. 1 are operated in the same frequency band (i.e. the second frequency band).

Figure 6:
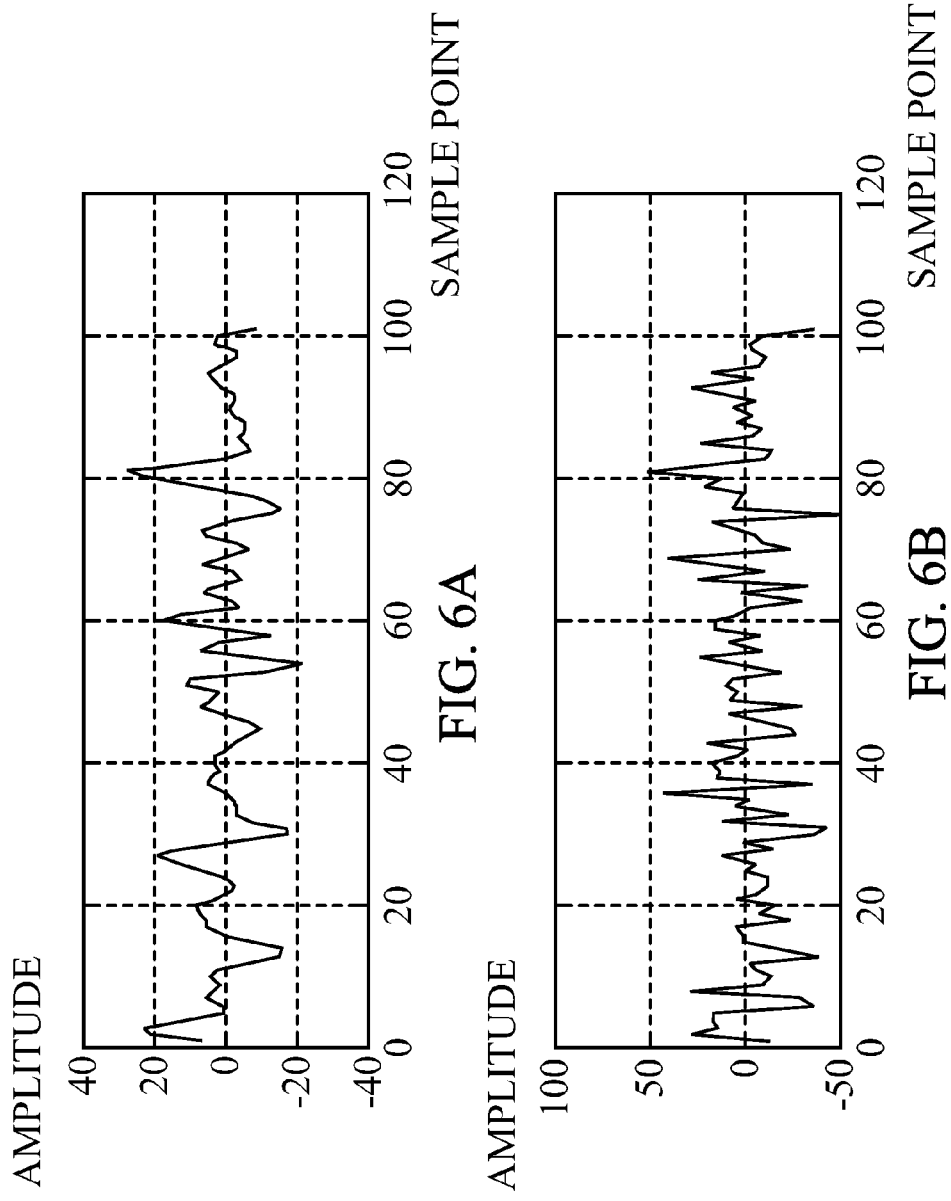
FIG. 6A is a schematic diagram showing a waveform of a luminance signal without a noise.
FIG. 6B is a schematic diagram showing a waveform of a luminance signal with a noise.
Figure 7:
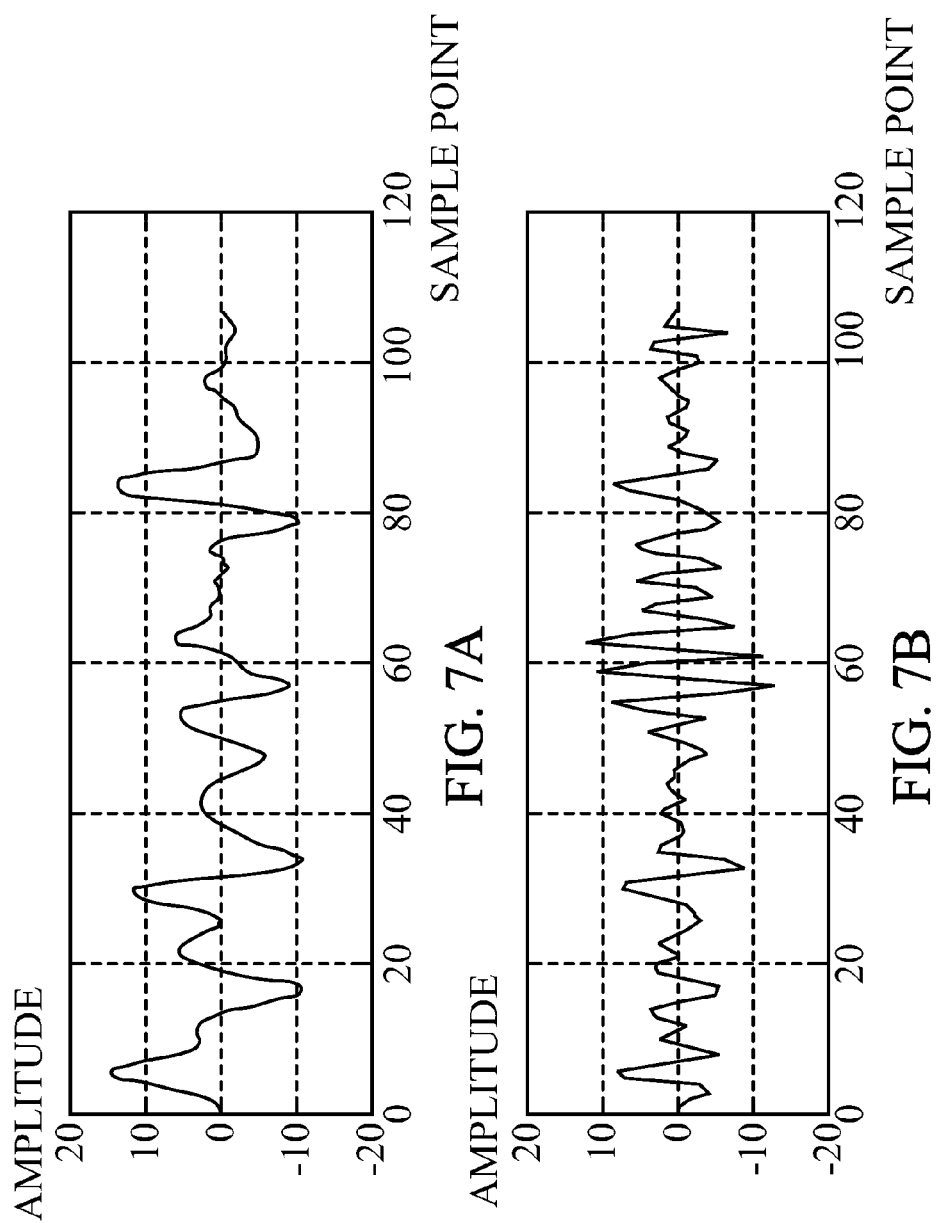
FIG. 7A is a schematic diagram showing a waveform of a low frequency band component of the luminance signal without the noise.
FIG. 7B is a schematic diagram showing a waveform of a high frequency band component of the luminance signal without the noise.
Figure 8:
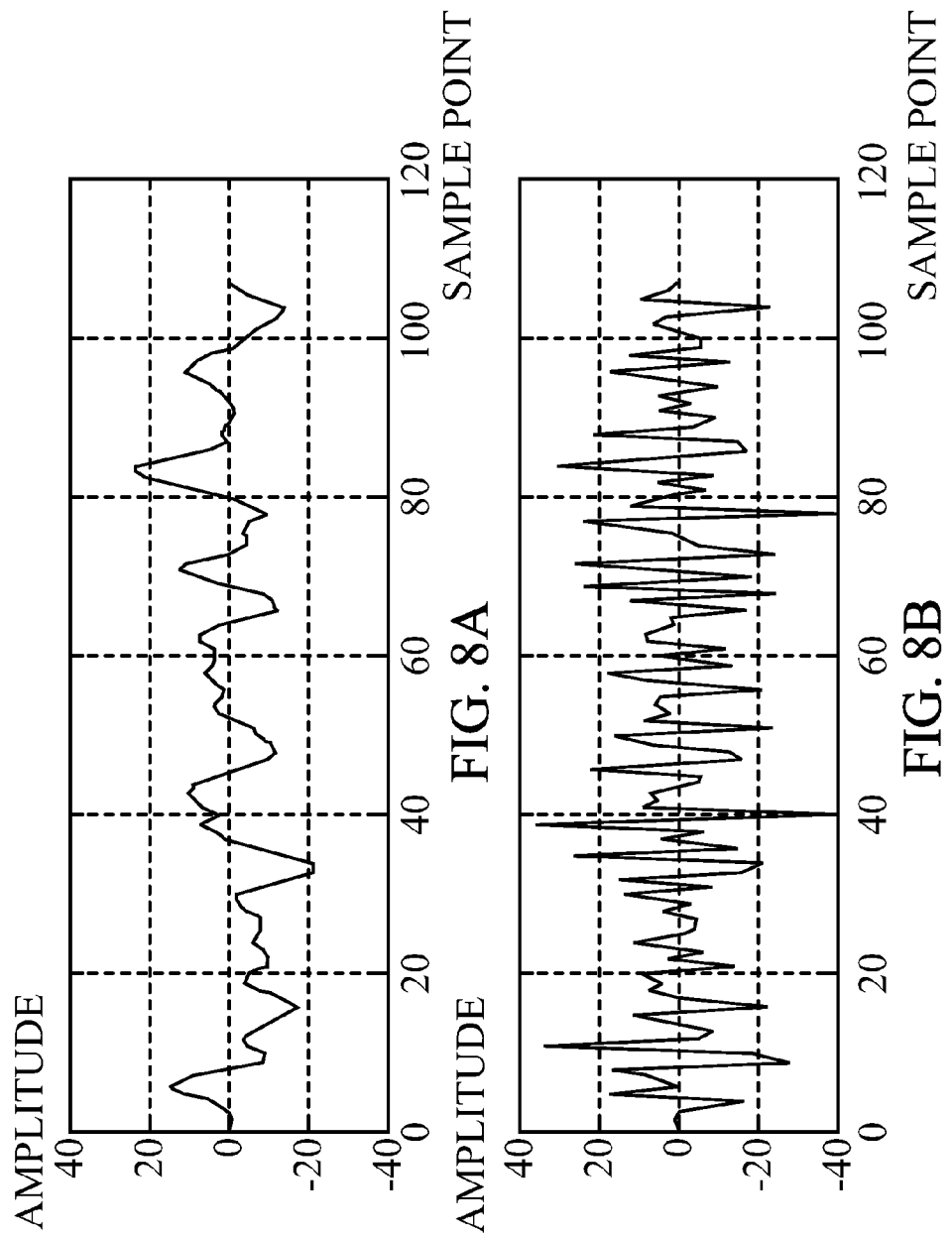
FIG. 8A is a schematic diagram showing a waveform of a low frequency band component of the luminance signal with the noise.
FIG. 8B is a schematic diagram showing a waveform of a high frequency band component of the luminance signal with the noise.
Figure 9:
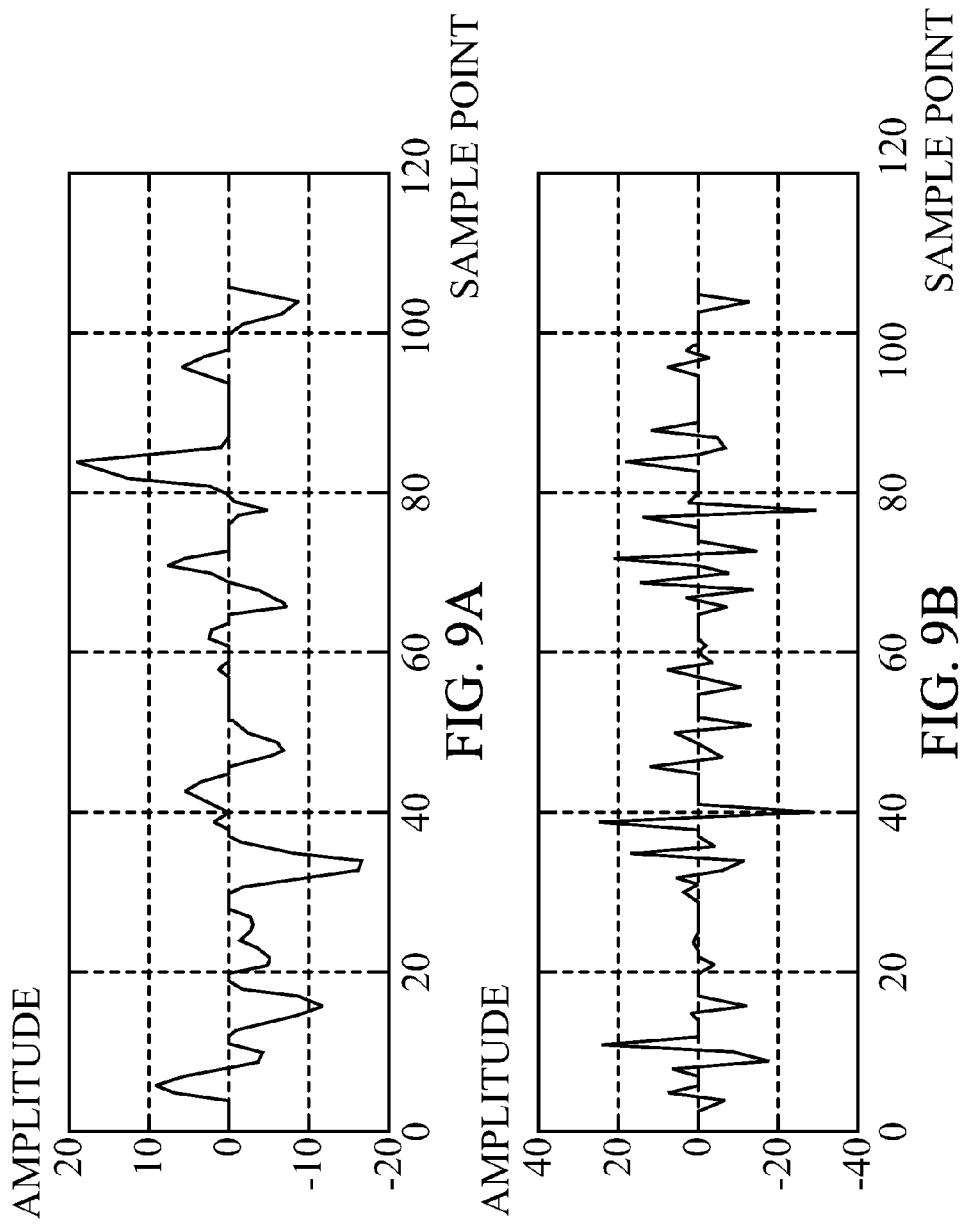
FIG. 9A is a schematic diagram showing a waveform after the low frequency band component of the luminance signal with the noise is processed by the first soft threshold processing unit in FIG. 1.
FIG. 9B is a schematic diagram showing a waveform after the high frequency band component of the luminance signal with the noise is processed by the second soft threshold processing unit in FIG. 1.

Pleaser refer to FIG. 6A to FIG. 9B. FIG. 6A is a schematic diagram showing a waveform of a luminance signal without a noise, and FIG. 6B is a schematic diagram showing a waveform of a luminance signal with a noise. FIG. 7A is a schematic diagram showing a waveform of a low frequency band component of the luminance signal without the noise, and FIG. 7B is a schematic diagram showing a waveform of a high frequency band component of the luminance signal without the noise. FIG. 8A is a schematic diagram showing a waveform of a low frequency band component of the luminance signal with the noise (i.e. the luminance signal is not processed by the first soft threshold processing unit 110 in FIG. 1), and FIG. 8B is a schematic diagram showing a waveform of a high frequency band component of the luminance signal with the noise (i.e. the luminance signal is not processed by the second soft threshold processing unit 112 in FIG. 1). FIG. 9A is a schematic diagram showing a waveform after the low frequency band component of the luminance signal with the noise is processed by the first soft threshold processing unit 110 in FIG. 1, and FIG. 9B is a schematic diagram showing a waveform after the high frequency band component of the luminance signal with the noise is processed by the second soft threshold processing unit 112 in FIG. 1. For the low frequency band component, amplitudes of some sample points in FIG. 9A are smaller than amplitudes of some sample points in FIG. 8A. This means that the noise in some sample points is not enhanced. For the high frequency band component, amplitudes of some sample points in FIG. 9B are smaller than amplitudes of some sample points in FIG. 8B. This means that the noise in some sample points is not enhanced.

Figure 10:
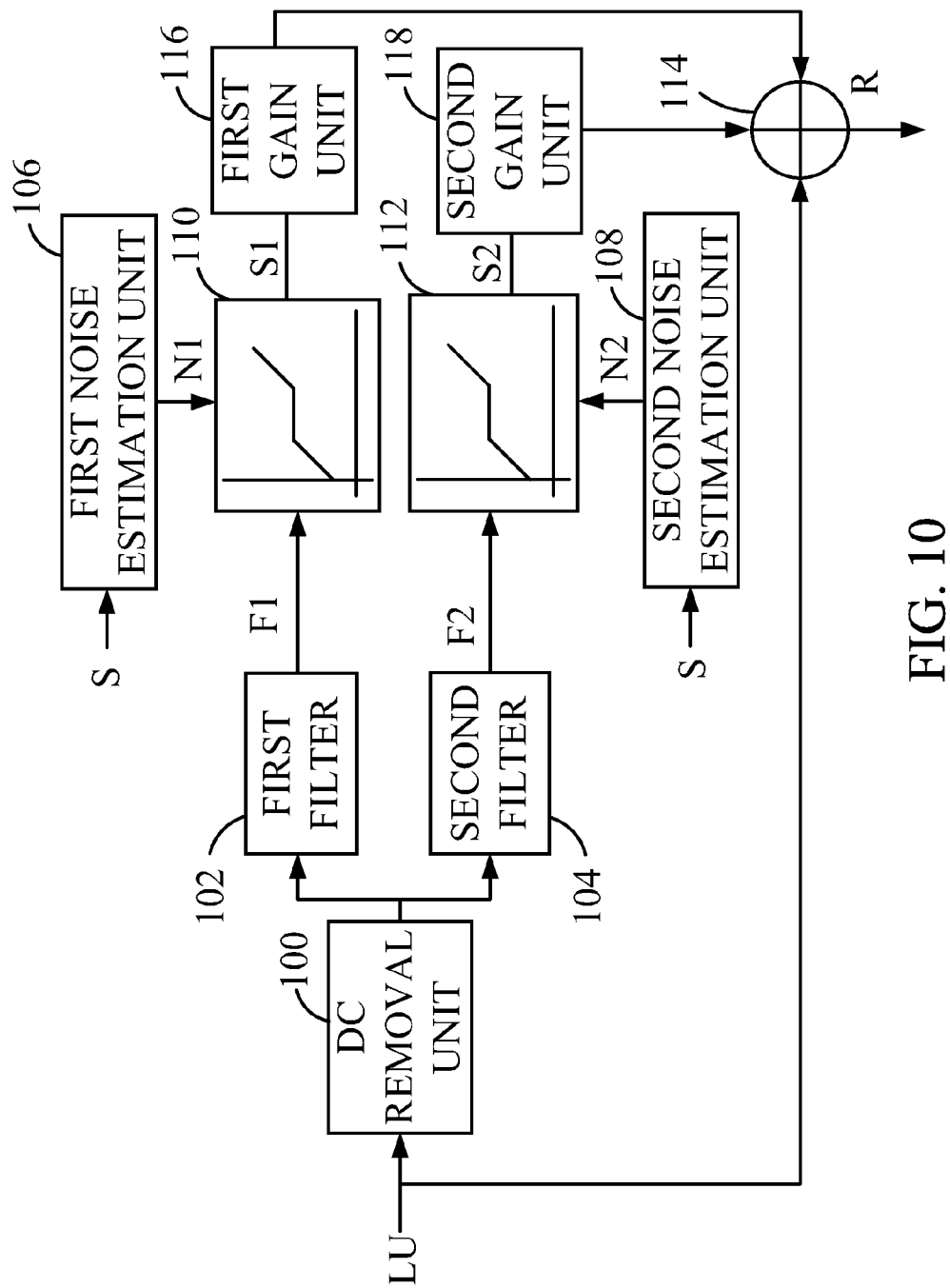
FIG. 10 is a schematic diagram showing an image sharpness device according to a second embodiment of the present invention.

Please refer to FIG. 10. FIG. 10 is a schematic diagram showing an image sharpness device according to a second embodiment of the present invention. Compared with the image sharpness device of the first embodiment in FIG. 1, the image sharpness device of the second embodiment further comprises a first gain unit 116 and a second gain unit 118.

The first gain unit 116 is electrically coupled to the first soft threshold processing unit 110 and capable of controlling an intensity of at least one of a black component and a white component in the first sharpness signal S1. The second gain unit 118 is electrically coupled to the second soft threshold processing unit 112 and capable of controlling an intensity of at least one of a black component and a white component in the second sharpness signal S2.

It is noted that there are two filters 102, 104 in the first embodiment in FIG. 1 and the second embodiment in FIG. 10. In another embodiment, the image sharpness device of the present invention may comprise three or more filters. Each of the filters may be operated in a predetermined frequency band as required.

Figure 11:
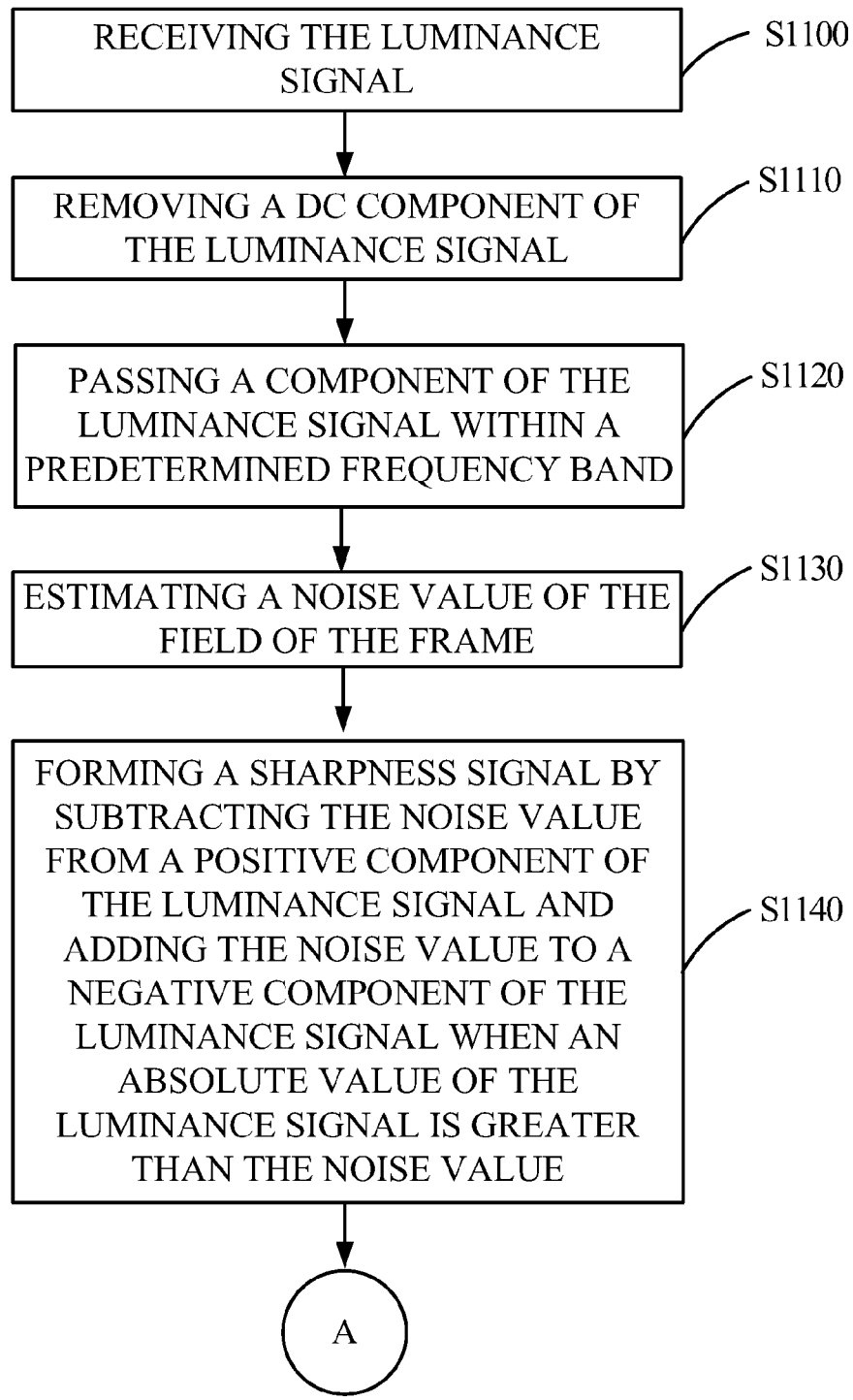
FIG. 11 is a flow chart showing an image sharpness method according to an embodiment of the present invention.
Figure 11:
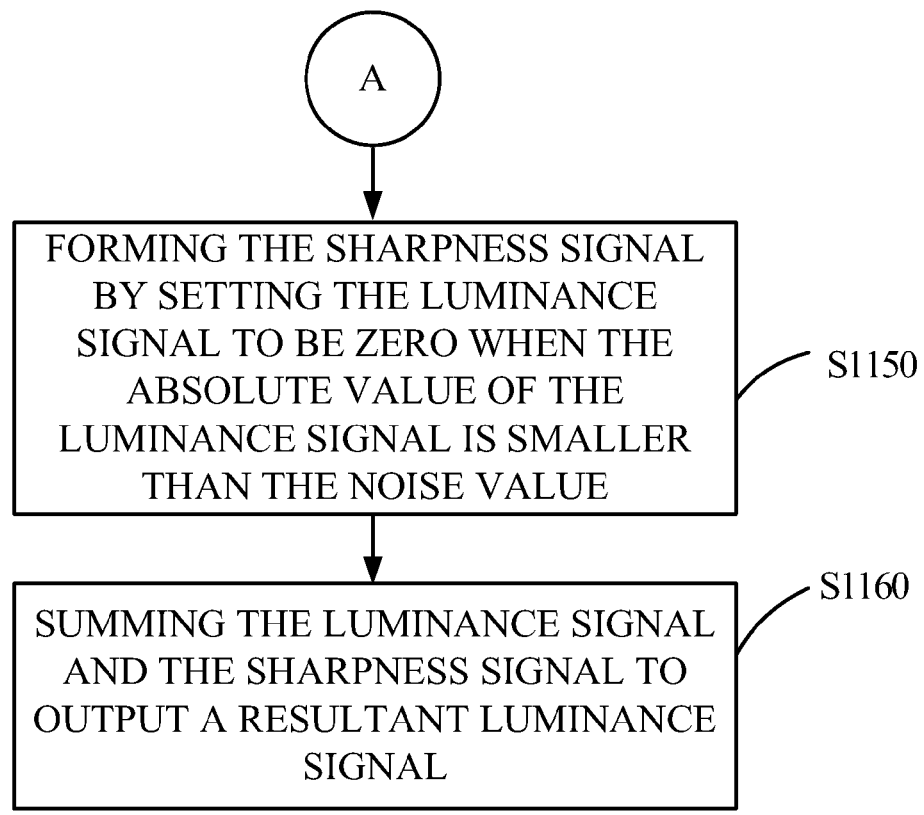

Please refer to FIG. 11. FIG. 11 is a flow chart showing an image sharpness method according to an embodiment of the present invention.

In the image sharpness method, a composite video signal in a field of a frame has a luminance signal and a chrominance signal. The image sharpness method of the present invention comprises the following steps.

In step S1100, the luminance signal is received.

In step S1110, a DC component of the luminance signal is removed.

In step S1120, a component of the luminance signal within a predetermined frequency band is passed, while the other components of the luminance signal is filtered out. It is noted that the DC component of the luminance signal in the present step is removed.

In step S1130, a noise value of the field of the frame is estimated. In one embodiment, the step of estimating the noise value comprises: receiving a signal in at least one blank line of the field and removing a DC component of the signal, wherein the blank line of the field is a scan line without the luminance signal; passing a component of the signal within the predetermined frequency band while filtering out the other components of the signal; and estimating a noise of the component of the signal within the predetermined frequency band to generate the noise value. The blank line is determined according to National Television System Committee standard or Phase Alternation by Line standard as mentioned above.

In the step of estimating the noise of the component of the signal within the predetermined frequency band to generate the noise value comprises: generating a plurality of absolute values of the component of the signal within the predetermined frequency band; finding out a maximum value in an N-point cycle of the field; and accumulating a plurality of maximum values in a plurality of N-point cycles of the field. N is a positive integer. N-point is depending on a sampling frequency of the luminance signal. It is noted that the DC component of the signal in the present step is removed.

In step S1140, a sharpness signal is formed by subtracting the noise value from a positive component of the luminance signal within the predetermined frequency band and adding the noise value to a negative component of the luminance signal within the predetermined frequency band when an absolute value of the luminance signal within the predetermined frequency band is greater than the noise value. It is noted that the DC component of the luminance signal in the present step is removed.

In step S1150, the sharpness signal is formed by setting the luminance signal within the predetermined frequency band to be zero when the absolute value of the luminance signal within the predetermined frequency band is smaller than the noise value. It is noted that the DC component of the luminance signal in the present step is removed.

In step S1160, the luminance signal and the sharpness signal are summed to output a resultant luminance signal. It is noted that the DC component of the luminance signal in the present step is not removed.

In one embodiment, the image sharpness method of the present invention further comprises the step of controlling an intensity of at least one of a black component and a white component in the sharpness signal before the step S1160.

The image sharpness device and the method for the same according to the present invention are capable of avoiding the problem that a noise in the luminance signal is enhanced by adaptively estimating the noise at the time of enhancing the luminance signal. In a worst case, that is, when the noise is greater than the luminance signal, the luminance signal is not enhanced and thus the noise is not enhanced, either.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. An image sharpness device, a composite video signal of a field of a frame having a luminance signal, the image sharpness device comprising:
   a DC removal unit, receiving the luminance signal and removing a DC component of the luminance signal;
   at least one filter, passing a component of an output of the DC removal unit within a predetermined frequency band while filtering out the other components of the output of the DC removal unit;
   at least one noise estimation unit, estimating a noise value of the field of the frame;
   at least one soft threshold processing unit, forming a sharpness signal by subtracting the noise value from a positive component of the output of the filter and adding the noise value to a negative component of the output of the filter when an absolute value of an output of the filter is greater than the noise value, or forming the sharpness signal by setting the output of the filter to be zero when the absolute value of the output of the filter is smaller than the noise value; and
   a summing unit, summing the luminance signal and the sharpness signal to output a resultant luminance signal, wherein the noise estimation unit comprises:
   a noise estimation DC removal unit, receiving a signal in at least one blank line of the field and removing a DC component of the signal, wherein the blank line of the field is a scan line without the luminance signal;
   a noise estimation filter, passing a component of an output of the noise estimation DC removal unit within the predetermined frequency band while filtering out the other components of the output of the noise estimation DC removal unit; and
   a noise estimation processing unit, estimating a noise of an output of the noise estimation filter to generate the noise value.

2. The image sharpness device of claim 1, wherein the DC removal unit is a band pass filter or a high pass filter.

3. The image sharpness device of claim 1, wherein the blank line is determined according to National Television System Committee standard or Phase Alternation by Line standard.

4. The image sharpness device of claim 1, wherein the noise estimation processing unit estimates the noise of the output of the noise estimation filter by generating a plurality of absolute values of the output of the noise estimation filter, finding out a maximum value in an N-point cycle of the field, accumulating a plurality of maximum values in a plurality of N-point cycles of the field, N is a positive integer.

5. The image sharpness device of claim 4, wherein N-point is depending on a sampling frequency of the luminance signal.

6. The image sharpness device of claim 1, further comprising at least one gain unit for controlling an intensity of at least one of a black component and a white component in the sharpness signal.

7. An image sharpness method, a composite video signal in a field of a frame having a luminance signal, the image sharpness method comprising:
  receiving the luminance signal;
  removing a DC component of the luminance signal;
  passing a component of the luminance signal within a predetermined frequency band while filtering out the other components of the luminance signal;
  estimating a noise value of the field of the frame;
  forming a sharpness signal by subtracting the noise value from a positive component of the luminance signal within the predetermined frequency band and adding the noise value to a negative component of the luminance signal within the predetermined frequency band when an absolute value of the luminance signal within the predetermined frequency band is greater than the noise value;
  forming the sharpness signal by setting the luminance signal within the predetermined frequency band to be zero when the absolute value of the luminance signal within the predetermined frequency band is smaller than the noise value; and
  summing the luminance signal and the sharpness signal to output a resultant luminance signal,
  wherein the step of estimating the noise value of the field of the frame comprises:
  receiving a signal in at least one blank line of the field and removing a DC component of the signal, wherein the blank line of the field is a scan line without the luminance signal;
  passing a component of the signal within the predetermined frequency band while filtering out the other components of the signal; and
  estimating a noise of the component of the signal within the predetermined frequency band to generate the noise value.

8. The image sharpness method of claim 7, wherein the blank line is determined according to National Television System Committee standard or Phase Alternation by Line standard.

9. The device image sharpness method of claim 7, wherein the step of estimating the noise of the component of the signal within the predetermined frequency band to generate the noise value comprises:
  generating a plurality of absolute values of the component of the signal within the predetermined frequency band;
  finding out a maximum value in an N-point cycle of the field; and
  accumulating a plurality of maximum values in a plurality of N-point cycles of the field, N is a positive integer.

10. The image sharpness method of claim 9, wherein N-point is depending on a sampling frequency of the luminance signal.

11. The image sharpness method of claim 7, further comprising the step of controlling an intensity of at least one of a black component and a white component in the sharpness signal before the step of summing the luminance signal and the sharpness signal to output the resultant luminance signal.

* * * * *